June 18, 1929.  C. H. AYARS  1,717,827
TOMATO CORING MACHINE
Filed March 24, 1927  6 Sheets-Sheet 2

FIG. 2

WITNESSES:

INVENTOR:
Charles H. Ayars,
BY
Joshua R. H. Potts
ATTORNEY

June 18, 1929.  C. H. AYARS  1,717,827
TOMATO CORING MACHINE
Filed March 24, 1927  6 Sheets-Sheet 5

WITNESSES:

INVENTOR:
Charles H. Ayars,
BY
ATTORNEY.

June 18, 1929.   C. H. AYARS   1,717,827
TOMATO CORING MACHINE
Filed March 24, 1927   6 Sheets-Sheet 6

WITNESSES:

INVENTOR:
Charles H. Ayars,
BY
ATTORNEY.

Patented June 18, 1929.

1,717,827

UNITED STATES PATENT OFFICE.

CHARLES H. AYARS, OF SALEM, NEW JERSEY.

TOMATO-CORING MACHINE.

Application filed March 24, 1927. Serial No. 177,924.

My invention relates to vegetable preparing machinery and more particularly to a machine adapted to remove the cores and hard spots from tomatoes and the like.

In preparing tomatoes for canning, it is necessary to remove the core and hard spot formed at the point where the tomato is joined to its stem and, as the seed cells are often in close proximity to the core, the operation must be accurately and neatly performed in order to avoid rupturing the seed cells. This operation is usually performed by hand and, to the best of my knowledge, no machine has heretofore been produced which would successfully remove the cores from tomatoes.

The objects of my invention are to provide a machine that will core tomatoes quickly and neatly without danger of rupturing the seed cells; that will be automatic in its operation, and that will operate in conjunction with conveyors or other machinery.

These objects, and other advantageous ends which will be described hereinafter, I attain in the following manner, reference being had to the accompanying drawings in which—

Referring now in detail to the drawings, the machine is mounted in any suitable frame and is shown as being provided with a base 10 having legs 10ª, 10ᵇ, and 10ᶜ and a bearing 11 formed at its center. A C-shaped frame member 12 is suitably secured on leg 10ª and is provided with a bearing 13 at its upper end adapted to receive the upper end of a shaft 14; the lower end of which is rotatable in bearing 11. A frame member 15 is suitably secured to leg 10ᵇ and another frame member 16 suitably secured to leg 10ᶜ. A support 17 is secured to the upper ends of frame members 15 and 16 and holds them in rigid spaced relation to one another.

A beveled gear 18 is fixed on shaft 14 and bears against the top of bearing 11 so as to support the shaft therein. A table 19 is fixed near the upper end of shaft 14 and has a series of core removing devices 20 fixed to its under side and aligning with apertures 21 formed in the table top. Fixed to the upper side of table 19 and to the upper end of shaft 14 are a series of gripping devices 22, each of which aligns with a core removing device 20. A cam 23 is fixed to the upper end of frame member 12 and is adapted to be engaged by rollers 24, forming parts of gripping devices 22, as will later be described.

A short distance above gear 18, a collar 25 is fixed to shaft 14 and supports a gear 26 which is rotatable on shaft 14 and rigidly connected to a spur gear 27 by means of a quill shaft 28 rotatable on shaft 14. In order to carry the load imposed upon shafts 14 and 28, gears 18 and 26 may be supported on suitable antifriction bearings as shown.

Motion is imparted to table 19 in any suitable manner as by means of a chain driven sprocket 29 keyed to a shaft 30 rotatable in a bearing 31, formed in frame member 15, and in a double bearing 32, mounted on leg 10ᵇ, and having a pinion 33 fixed to its other end and meshing with gear 18. Motion is imparted to spur gear 27 by means of a gear 34 fixed on shaft 30 and meshing with a gear 35 fixed on a shaft 36, rotatable in frame member 15 and in bearing 32, having a gear 37 fixed on its inner end and meshing with gear 26.

Figure 5:
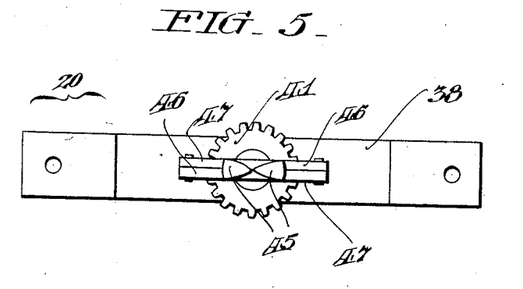
Figure 5 is a top plan view of a core removing device, forming a part of my invention, and Figure 6 an elevation thereof, certain parts being shown in cross section.
Figure 6:
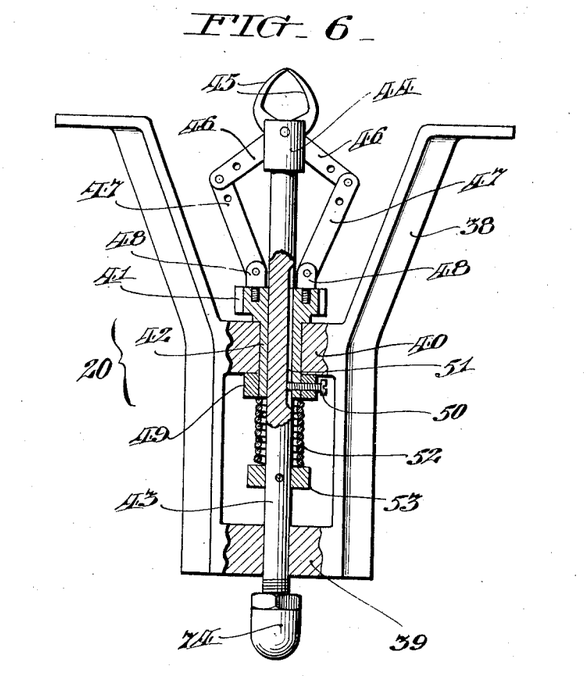

Each core removing device 20 is provided with a frame 38 adapted to be secured to the under side of table 19 immediately below an aperture 21. The two sides of frame 38 are joined at their bottoms by a bearing 39 and aproximately midway of their lengths by a bearing 40. A pinion 41, having an elongated hub 42 and adapted to mesh with spur gear 27, is rotatable in bearing 40 and a shaft 43 is rotatable in bearing 39 and slidable through a bore formed in pinion 41. The upper end of shaft 43 is provided with a bifurcated head 44 in which is hinged a pair of pincer-like members 45 which are provided with extensions 46. To the outer end of each extension 46 is hinged one end of a link 47; the other end of which is hinged in a bifurcated bearing 48 secured to the top of pinion 41.

A collar 49 encircles the lower end of hub 42 and abuts the underside of bearing 40 while a set screw 50 extends through collar 49 and hub 42 into an elongated keyway 51 formed in shaft 43; thus preventing gear 41 from moving longitudinally through bearing 40 and causing shaft 43 to rotate with gear 41. It is evident that moving shaft 43 downwardly through bearings 39 and 40 will cause pincers 45 to open and that raising shaft 43 will cause them to close. Shaft 43 is moved downwardly by its own weight and by the action of a coiled spring 52 which encircles shaft 43 between collar 50 and a collar 53 secured to the shaft in any suitable manner. Collar 53 is adapted to abut the top of bearing 39 and limit the downward movement of shaft 43.

Figure 7:
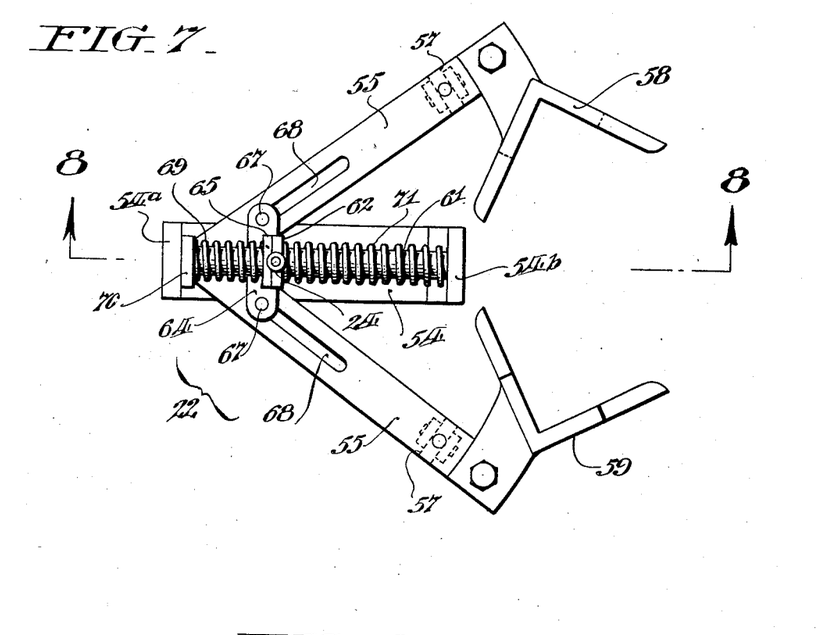
Figure 7 is a top plan view of a gripping device, forming a part of my invention, and Figure 8 a cross sectional view thereof, taken on line 8—8 on Figure 7.
Figure 8:
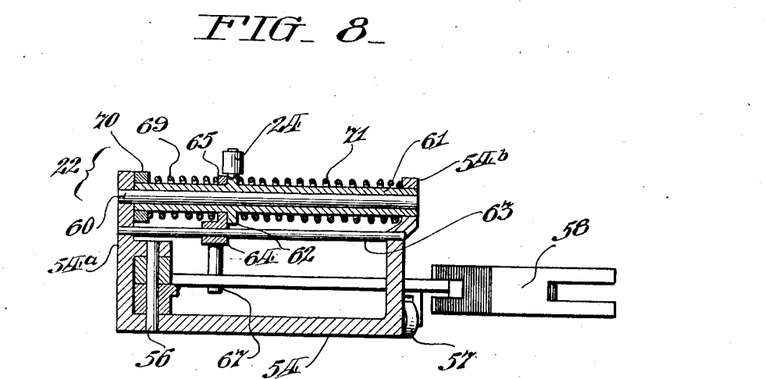

Each gripping device 22 is provided with a frame 54 which is adapted to be fastened to the top of table 19 and, when so desired, to shaft 14. A pair of arms 55 are pivoted on a pin 56 mounted in frame 54 and are provided near their outer ends with rollers 57 which are adapted to ride on the top of table 19 in order to hold arms 55 in the desired plane. To the outer end of one arm 55 is secured a jaw 58 which has two bifurcated portions extending substantially at right angles to one another. Secured to the outer end of the other arm 55 is a jaw 59 which is similar to jaw 58 with the exception that the portions extending at right angles to one another are provided with reduced portions adapted to enter the bifurcations formed in jaw 58.

A rod 60 is fixed in the upper part of end 54ª of frame 54 and has a tubular member 61 slidably mounted thereon and provided with a boss 62 near its center on which is mounted roller 24. A rod 63 is fixed in frame 54 immediately below member 61 and has slidably mounted thereon a member 64 which is provided with an upper part 65 having an aperture through which tubular member 61 extends and has a pin 67 depending from each end and engaging slots 68 in arms 55. A spring 69 encircles tubular member 61 and has one end abutting upper part 65 and its other end abutting a collar 70 fixed to the end of tubular member 61. Another spring 71 encircles tubular member 61 between boss 62 and the outer end 54ᵇ of frame 54.

When roller 24 is moved outwardly by engaging a high point on cam 23, tubular member 61 will slide on rod 60 and extend through front part 54ᵇ and spring 71 will be compressed by boss 62. This movement of roller 24 will allow spring 69 to move member 64 outwardly and cause pins 67 to move in slots 68 and draw jaws 58 and 59 together. It will be noted that cam 23 merely removes the spring pressure on one side of member 64 and does not, of itself, cause jaws 58 and 59, to come together. It is intended that spring 69 shall be of only sufficient strength to move jaws 58 and 59 together in order to firmly hold a tender fruit, such as a tomato, without bruising or crushing same. As table 19 revolves and moves roller 24 away from the high point on cam 23, spring 71 will move member 64 rearwardly and open the jaws of the gripping device.

Figure 1:
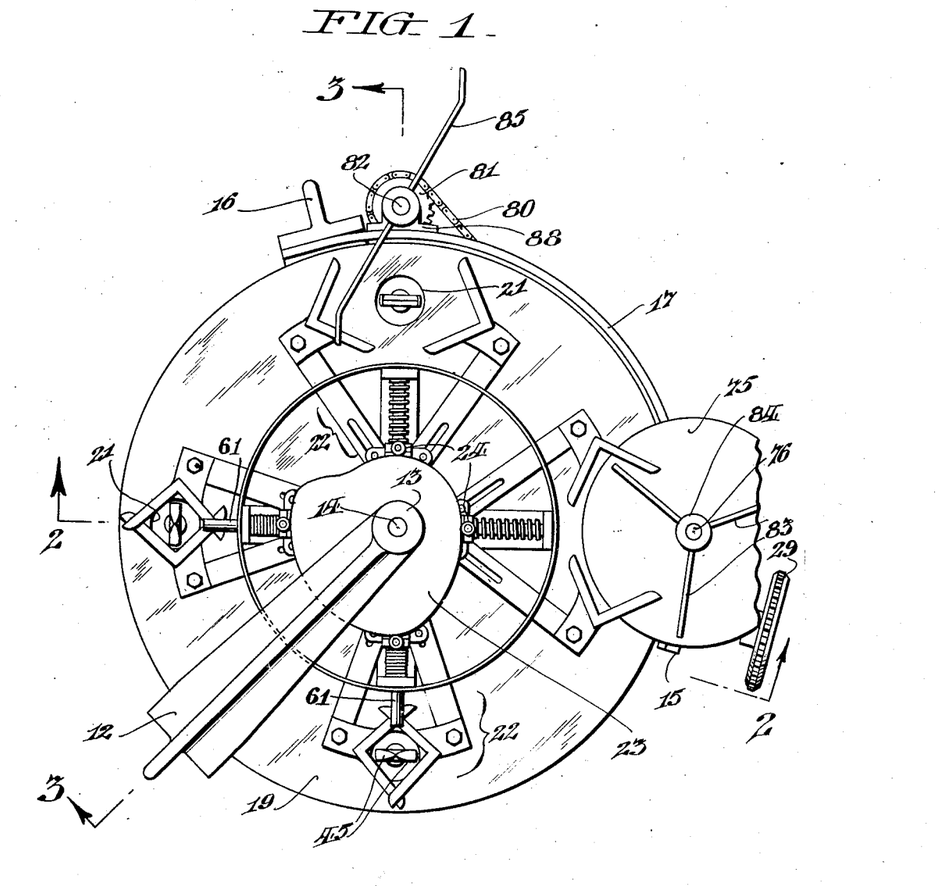
Figure 1 is a top plan view of a machine embodying my invention.
Figure 2:
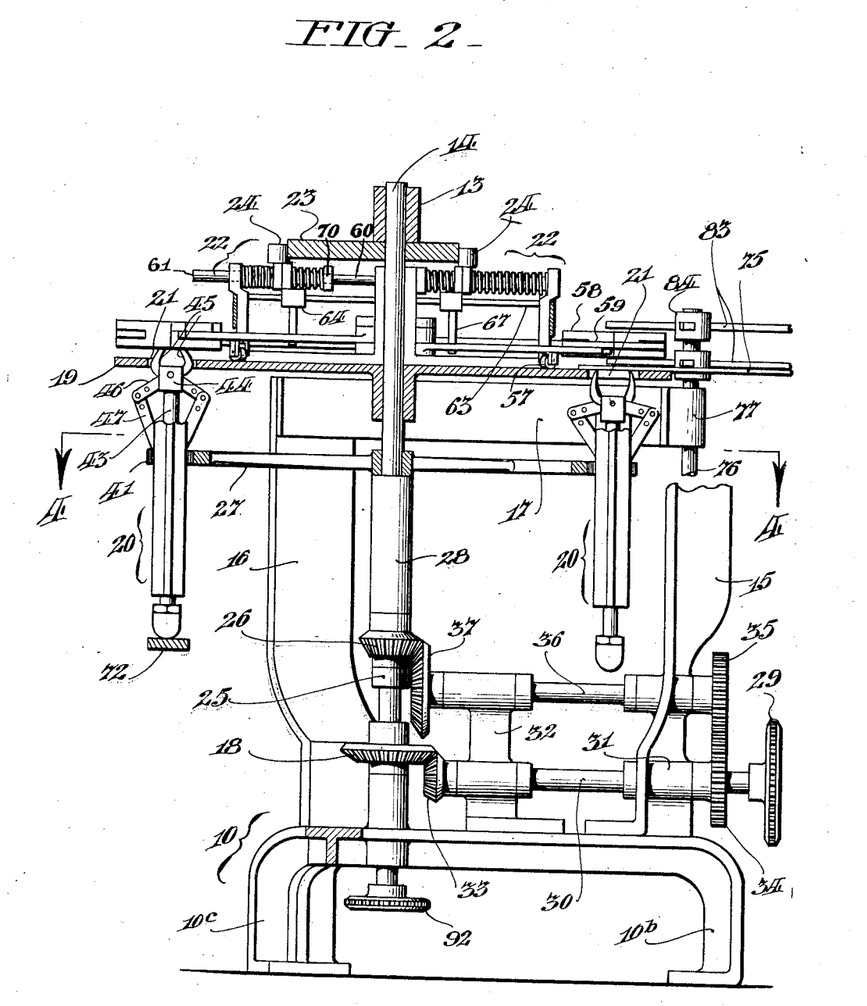
Figure 2 a cross sectional view, taken substantially on line 2—2 on Figure 1, shown partly in full and with certain parts broken away.
Figure 3:
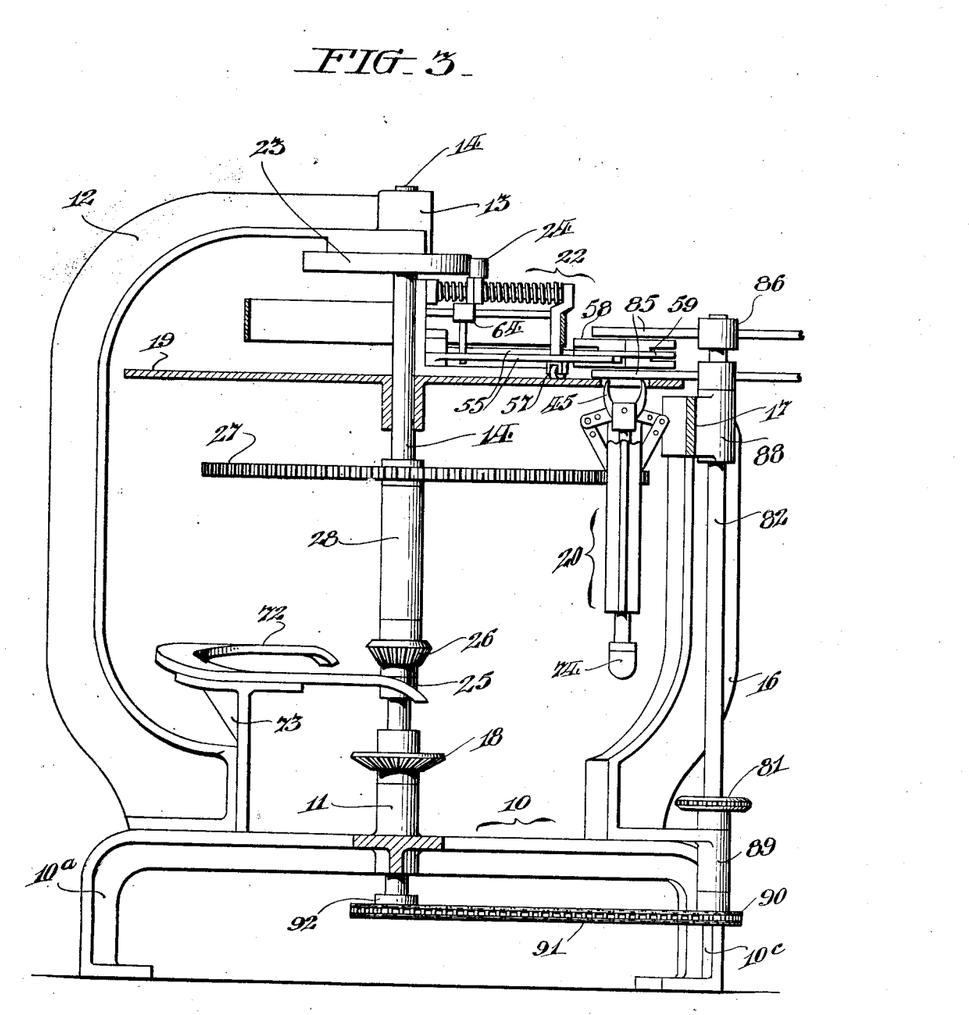
Figure 3 is a cross sectional view, partly in full, taken substantially on line 3—3 on Figure 1; certain parts having been omitted for the sake of simplicity, and Figure 4 a sectional view taken on line 4—4 on Figure 2.
Figure 4:
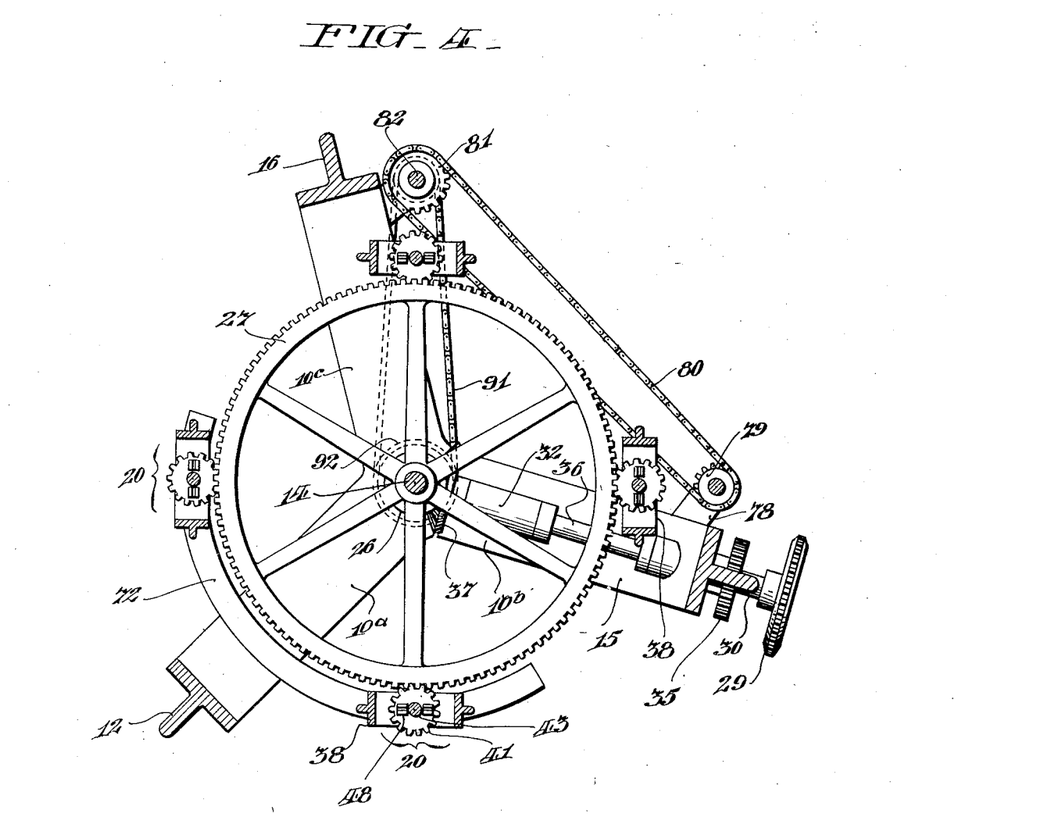

In order that the pincers 45 of device 20 will rise and close at the proper time, I provide a cam track 72 mounted on a support 73 secured to the base and to frame member 12. Assuming that the machine is in the position shown in the drawings and that a tomato is placed over the aperture 21 shown at the right of Figures 2 and 3 and power applied to actuate the machine, table 19 would rotate in a clockwise direction and gear 27 in an anti-clockwise direction. When table 19 has moved about a quarter turn, roller 24 will have reached the high point of cam 23 and caused jaws 58 and 59 to grip the tomato and hold same centrally over aperture 21. At approximately the same point, a contact piece 74, adjustably secured to the bottom of shaft 43, will come in contact with the end of cam track 72, and, as the table continues to rotate, raise shaft 43 and cause pincers 45 to rise and close; it being understood that they are revolving rapidly due to gear 27 being in mesh with pinion 41. When they have reached their uppermost position, the points of the pincers will be approximately in contact with one another and a small cone-shaped piece will have been removed from the center of the tomato without in any way mutilating or bruising the tomato, or without rupturing the seed bags. Extra holes are provided near the outer ends of extensions 46 and in the adjacent ends of links 47 in order that adjustment of pincers 45 may be made by selecting the proper holes for connecting links 47 to extensions 46.

As table 19 continues to rotate, contact piece 74 will leave cam track 72, allowing pincers 45 to lower and open, and roller 24 will ride off from the high point of cam 23 and allow the jaws of gripping device 22 to open and release the tomato which may then be removed from the machine. While any number of gripping devices and core removing devices may be employed, in practice, I find that a machine equipped with four of each gives highly satisfactory results. Also, unless the machine is very small, it is not necessary to rotate gear 27 as pincers 45 may be rotated at a sufficient speed due to the ratio of pinions 41 to gear 27.

Tomatoes may be placed on the machine by hand but it is designed to work in conjunction with other machinery and it is especially adapted to work in conjunction with the tomato trimmer described and claimed in my co-pending application, Serial No. 166,867, filed February 9, 1927. For this purpose, I provide a disk 75 fixed to a shaft 76 rotatably mounted in a bearing 77 secured to support 17 and in a bearing 78 secured to base 10. Shaft 76 is rotated by means of a sprocket 79 secured to its bottom end and engaged by a chain 80 which passes over a sprocket 81 fixed to a shaft 82 which is rotated in a manner to be described later.

A plurality of arms 83 are fixed in hubs 84 mounted on the top of shaft 76 in such a manner that the upper arms will clear the upper sides of jaws 58 and 59 while the lower arms will clear their under sides. One edge of disk 75 is adapted to lap under the edge of the conveyor belt of the tomato trimming machine while arms 83 will rotate above the conveyor belt. The machine is timed with the tomato trimmer so that one pair of arms 83 sweep across the top of the conveyor belt every time a tomato carrying seat passes this point, thus sweeping the tomato from the trimming machine belt onto disk 75. Rotation of disk 75 and arms 83 will carry the tomato between jaws 58 and 59 and, as table 19 and the jaws are revolving, the tomato will be deposited against one of the jaws so that, as the jaws close, the tomato will be centrally positioned over aperture 21.

The tomatoes may be removed from table 19 by hand, but in order that they may be mechanically removed to a conveyor belt or any other desired mechanism, I provide a pair of arms 85 mounted in hubs 86 secured to the upper end of a shaft 82 which is rotatable in a bearing 88, fixed to support 17, and in a bearing 89 fixed to base 10. Shaft 82 is rotated by means of a sprocket 90 fixed to its lower end and engaged by a chain 91 which passes over a sprocket 92 fixed to shaft 14. As shaft 76 and 82 are connected by means of chain 80, it is evident that arms 83 and 85 will rotate in unison. As shaft 76 is provided with three pairs of arms and shaft 82 with but two pairs, it is understood that sprockets 79 and 81 are of the correct radii to cause the movements of these arms to synchronize.

While I have described my invention as taking a particular form, it will be understood that modifications may be made without departing from the spirit thereof, and hence I do not limit myself to the precise construction, set forth, but consider that I am at liberty to make such changes and alterations as fairly come within the scope of the appended claims.

Having thus described my invention, what I claim as new and desire to secure by Letters Patent is:—

1. A coring machine including a rotatable table, coring prongs rotatably mounted beneath the table, means for raising the prongs through the table, means for rotating the prongs, and means for rotating the table.

2. A machine for coring tomatoes including a rotatable table, a coring device mounted beneath the table, coring prongs on the coring device, means for holding a tomato on the table while being cored, means for raising the coring prongs through the table, means for rotating the coring device and means for rotating the table.

3. A machine for coring tomatoes including a rotatable table, a coring device mounted beneath the table, coring prongs on the coring device, means for holding a tomato on the table while being cored, means for raising the coring prongs through the table, means for rotating the coring device, and means for rotating the table.

4. A machine for coring tomatoes including a table, a coring device mounted beneath the table, means for actuating the coring device, a device on the table for holding a tomato while being cored, and mechanical means for delivering a tomato into the holding device.

5. A machine for coring tomatoes including a table, a coring device mounted beneath the table, means for actuating the coring device, a device on the table for holding a tomato while being cored, mechanical means for delivering a tomato into the holding device, and mechanical means for removing the tomatoes from the table.

6. A machine for coring tomatoes including a rotatable table having apertures therein, a coring device beneath each aperture, means for actuating the coring devices, a gripping device on the table aligning with each aperture, a cam fixed above the gripping devices and contacting therewith, whereby rotation of the table will cause the cam to actuate the gripping devices.

7. A machine for coring tomatoes including a table, a gripping device on the table for holding a tomato, a gear wheel mounted below the table, a core-removing device below the table, and a pinion in the core-removing device for rotating same meshing with the gear wheel.

8. A gripping device including a frame mounted on a table, arms swingable in the frame, jaws on the arms, a spring adapted to close the jaws, a spring adapted to open the jaws, means for compressing the opening spring to allow the closing spring to close the jaws, and rollers on the arms arranged to ride on the table to maintain the jaws in the same plane.

9. A gripping device including a frame, a pair of arms swingable in the frame, a bifurcated jaw on one arm, a jaw on the other arm having reduced portions adapted to enter the bifurcations in the other jaw, a spring adapted to close the jaws, a spring adapted to open the jaws, and means for compressing the opening spring to allow the closing spring to close the jaws.

10. A gripping device including a frame, arms swingable in the frame, jaws on the arms, a spring carrying member slidable in the frame, a boss on the spring carrying member, a jaw closing spring at one side of the boss, a jaw opening spring at the other side of the boss, and means for compressing the jaw opening spring.

11. A gripping device including a frame, arms swingable in the frame, jaws on the arms, a jaw operating member slidable in the frame and having an aperture, extensions on the jaw operating member engaging the arms, a spring carrying member slidable in the frame and in the aperture in the jaw operating member, a jaw closing spring abutting one side of the jaw operating member, a boss on the spring carrying member having one side adapted to abut the other side of the jaw operating member, a jaw opening spring on the other side of the boss, and means for compressing the jaw opening spring.

12. A gripping device including a frame; arms, having slots therein, swingable in the frame; jaws on the arms; a jaw operating member slidable in the frame and engaging the slots; a spring carrying member slidable in the frame and in the jaw operating member; a collar fixed to one end of the spring carrying member; a jaw closing spring between the collar and the jaw operating member; a boss on the spring carrying member; a jaw opening spring between the boss and the other end of the spring carrying member; and means for compressing the jaw opening spring.

13. In a tomato coring machine having a cam and a rotatable table, means for holding a tomato while being cored including a frame mounted on the table, arms swingable in the frame, jaws on the arms, a spring carrying member slidable in the frame, a jaw closing spring thereon, a jaw opening spring thereon, and a roller mounted on the spring carrying member and engaging the cam whereby rotation of the table will cause compression of the jaw opening spring and allow the jaw closing spring to act.

14. In a tomato coring machine having a cam and a rotatable table, means for holding a tomato while being cored including a frame mounted on the table, arms swingable in the frame, interlocking jaws on the arms, rollers on the arms engaging the top of the table, a spring carrying member slidable in the frame, a jaw closing spring thereon, a jaw opening spring thereon, and a roller mounted on the spring carrying member and engaging the cam whereby rotation of the table will cause compression of the jaw opening spring and allow the jaw closing spring to act.

15. In a coring machine, means for removing the core from a tomato including a frame, a shaft rotatable in the frame, a pinion keyed to the shaft, core removing pincers hinged to the shaft, means for rotating the shaft, and means for opening and closing the pincers.

16. In a coring machine, means for removing the core from a tomato including a frame, a pinion rotatable in the frame, a shaft rotatable in the frame and slidable in the pinion, core removing pincers hinged to the shaft, means for rotating the shaft, and means for opening and closing the pincers.

17. In a coring machine, means for removing the core from a tomato including a frame, a pinion rotatable in the frame, a shaft rotatable in the frame and slidable in the pinion, core removing pincers hinged to the shaft, arms on the pincers, links hinged to the arm and to the pinion, means for rotating the pinion, and means for raising the shaft.

18. In a coring machine, means for removing the core from a tomato including a frame, a lower bearing in the frame, an upper bearing in the frame, a pinion rotatable in the upper bearing, a shaft rotatable in the lower bearing and slidably keyed to the pinion, core removing pincers hinged to the top of the shaft, jointed arms connecting the pincers to the gear whereby raising the shaft will close the pincers, a collar attached to the pinion for preventing same from moving upwardly, means for rotating the pinion, and means for raising the shaft.

19. In a coring machine, means for removing the core from a tomato including a frame, a lower bearing in the frame, an upper bearing in the frame, a pinion rotatable in the upper bearing, a shaft rotatable in the lower bearing and slidably keyed to the pinion, core removing pincers hinged to the top of the shaft, jointed arms connecting the pincers to the gear whereby raising the shaft will close the pincers, a collar attached to the pinion for preventing same from moving upwardly, means for rotating the pinion, means for raising the shaft, a spring for moving the shaft downwardly, and a collar for limiting such downward movement.

20. In a coring machine having a base and a spur gear, means for removing the core from a tomato including a frame, a lower bearing in the frame, an upper bearing in the frame, a pinion rotatable in the upper bearing and meshing with the spur gear, a shaft rotatable in the lower bearing and slidably keyed to the pinion, core removing pincers hinged to the top of the shaft, jointed arms connecting the pincers to the pinion whereby raising the shaft will close the pincers, a collar attached to the pinion for preventing same from moving upwardly, a cam track on the base of the machine, and a contacting piece on the lower end of the shaft adapted to engage the cam track.

21. A coring machine including a rotatable table; a frame mounted on the under surface of the table; a shaft slidably mounted on the frame; coring prongs pivoted in the upper end of the shaft, each having an extension; a pinion fixed to the shaft; links pivoted to the prong extensions and the upper face of the pinion; a cam, mounted in the path of travel of the shaft, adapted to be engaged by the shaft to raise the shaft to close the prongs and permit it to drop to withdraw the prongs, and means for rotating the table and the shaft.

22. A tomato coring machine including a rotary table having apertures therethrough; a gripping device for each aperture, mounted upon the table, having jaws adapted to grasp a tomato and position it over the aperture; a coring device for each aperture mounted on the underside of the table in alignment with the apertures; means for rotating the table; means for closing and opening the jaws of the gripping device, and means for actuating the coring device, the operating means being arranged to actuate the coring device immediately after the gripping device has positioned the tomato and to open the gripping jaws immediately after the coring device has been actuated.

23. A tomato coring machine including a rotary table having apertures therethrough; a gripping device for each aperture, mounted upon the table, having jaws adapted to grasp a tomato and position it over the aperture; a coring device for each aperture mounted on the underside of the table in alignment with the apertures; means for rotating the table; means for closing and opening the jaws of the gripping device; means for actuating the coring device, and means for moving the tomato from the aperture, the operating means being arranged to actuate the coring device immediately after the gripping jaws have placed the tomato in position, to open the gripping jaws immediately after the coring device has been actuated, and to remove the tomato from the aperture immediately after the gripping jaws have been opened.

In testimony whereof I have signed my name to this specification.

CHARLES H. AYARS.